May 26, 1942. G. N. HEIN 2,284,424

PACKING GLAND WITH OVERSIZE FLOATING GASKET

Filed May 31, 1940

INVENTOR.
GEORGE N. HEIN
BY
ATTORNEY.

Patented May 26, 1942

2,284,424

UNITED STATES PATENT OFFICE 2,284,424

PACKING GLAND WITH OVERSIZE FLOATING GASKET

George N. Hein, San Carlos, Calif.

Application May 31, 1940, Serial No. 338,170

4 Claims. (Cl. 286—26)

This invention relates to packing glands and particularly to a type of packing gland in which a diametrically oversized flexible sealing gasket is provided, loosely positioned in a gasket compartment and the entire face of the gasket being exposed to pressure.

Among the objects of the invention are to provide a packing gland which has very great holding power against pressure or suction, with a minimum of frictional resistance against any relatively movable or stationary contacting parts; another object is to provide a packing gland which has a radial surplus of gasket body to compensate for wear thereon, and in which pressure within a cylinder may greatly increase the sealing qualities of the gasket.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction may be resorted to within the scope of the appended claims without departing from the spirit or sacrificing any of the advantages of the invention.

To more clearly comprehend the invention, reference is directed to the accompanying drawing wherein.

Figure 1:
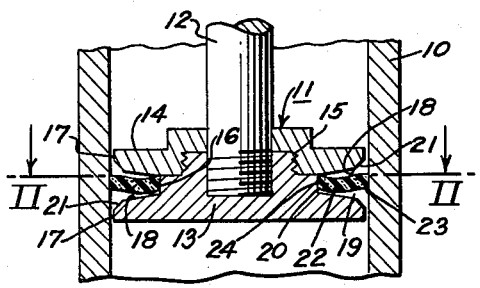
Fig. 1 is an axial transverse section of a piston form of the invention, partly broken away and partly in section.

Referring to Fig. 1 of the drawing which is illustrative of an adaptation of the invention to a piston assembly, 10 is a cylinder, the inner axial wall of which is circular in section. Slidable axially within the cylinder is a piston 11 which may be reciprocated by means of any suitable piston rod 12. The piston comprises, in addition to rod 12, a head, circular in plan, composed of head plate 13 and follower plate 14, the two plates being threadedly secured together as at 15 and providing a hub 16 which relatively spaces portions of the opposing faces 18 of the plates adjacent the hub and at their peripheral edges 17. In the exemplified form, the relatively spaced opposing faces 18 are radially converging providing a groove or gasket compartment 19 tapered in section, the wider relative spacing of said faces being adjacent the wall against which a seal is to be made, the opposite wall 20 of the compartment 19, or what may be termed the valley or bottom, being of lesser width. At the wider portion of the gasket compartment 19 each of the plates 13, 14 are preferably provided with a circumferential chamfer 21, which in the piston type of Fig. 1 would be at the peripheral edge. It is to be understood that the convergence of the faces of compartment 19 and provision of chamfer 21 are not the only form which may be provided for compartment 19, but are illustrated as one suitable and efficient form of such compartment.

Within the groove or gasket compartment 19, there is a flexible gasket 22, circular in plan. The material of the gasket may be broadly described as being distortable from a normal flat plane; it is contemplated that such description includes springy or resilient discs of material such as plastics formed concavo-convexedly, elastic or compressible material, such as rubber, discs of leather and the like, or any other material or combination of material which is adapted for distortion from a flat plane and has a resilience radially. A most common type of such a material is the rubber gasket 22 herein illustrated. The gasket 22, when positioned in operative relation within the compartment 19 has a radial width of body of greater radial width than the compartment or groove 19. By such arrangement of radial widths the gasket is compressed radially and has planar undulations when slidably operating in cylinder 10, by the bearing of its edge walls against the cylinder wall and hub in Fig. 1, and the shaft in Fig. 3, the oversize radial width of gasket being shown in broken lines of the projected gasket 22 in Fig. 3. The oversize of the gasket's radial width may be obtained in several ways; first, the entire oversize may be produced by providing considerably less diameter of the central bore of the gasket relative to the hub 16 of Fig. 1, or shaft 32 of Fig. 3, so that the gasket is expanded radially outward; second, the outer diameter may be normally of greater diameter than the inner diameter of cylinder 10, so that it is radially oversized; or third, and preferably, the first two methods may be combined so that the majority of increase or oversize is on its radially outer diameter. The reason for the preference is that it leaves the greater portion of the gasket tissue structure in a normal state, while if the increase be obtained by stretching the gasket at its central bore sufficient to produce the oversized periphery, the structural arrangement of the tissue would be subjected to a great strain and thereby greatly reduce its resilient and long wearing qualities.

The wall 20 at the bottom of the groove-compartment 19 has a greater axial width than the abutting wall 24 of the gasket so that the gasket is free to move axially within the compartment and to flex over its entire area subject to pressure within the cylinder. The oversize radial width of the gasket between its central portion and its peripheral edge causes it to have slight undulations in its plane due to its radial compression within the cylinder and thus causes it to have a continual resilient biting frictional bearing against the walls of cylinder 10 and hub 16 and to have a surplus of elastic material in its body so that when pressure is exerted on the planar face thereof the undulations will be somewhat flattened in the plane of the gasket and the elastic material thereof will be crowded radially. This so-called crowding of the gasket may be an inapt expression since the pressure, in levelling the undulations, in effect, compresses the material of the gasket between the hub and cylinder wall.

Figure 3:
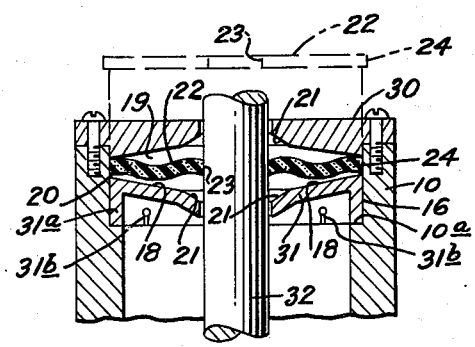
Fig. 3 is an axial transverse section of throat form of the invention, partly broken away and partly in section.
Figure 2:
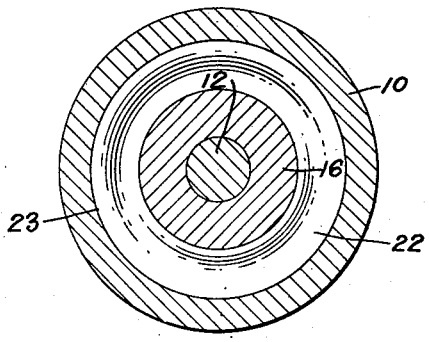
Fig. 2 is a fragmentary section of line II—II of Fig. 1.

In Fig. 3 the structure is adapted to a throat packing gland, the walls of the gasket compartment or groove 19 being stationary relative to cylinder 10, in which form one of the relatively opposing converging faces of the gasket compartment 19 may be the inner surface of the cylinder head 30, and the filler plate 31 resting on annular shoulder 10ª provides the opposing face. In Fig. 1 the piston 11 reciprocates relative to the inner wall of the cylinder, so that the sealing face 23 of the gasket slides on the cylinder wall, whereas in Fig. 3, the sealing face 23 of the gasket abuts the shaft 32 which reciprocates axially of the cylinder. The gasket 22, as in Fig. 1, is, when in operative relation within the cylinder 10, of greater peripheral diameter than the inner wall of the cylinder, and preferably of lesser diameter at its central opening than the diameter of shaft 32, the latter providing the equivalent of a hub for the sealing face 23 of the gasket. In Fig. 3, opposing faces 18 of the gasket compartment 19 converge radially outwardly toward the bottom of the groove, which in Fig. 3 is the inner wall of the cylinder. It is to be understood that the shaft 32 may be either reciprocable or rotative.

In the present exemplification adapting the invention to a piston or to a throat packing in which the gasket has inner and outer edge walls 23, 24, in order to distinguish between the inner and outer edge walls, the term "sealing edge" has been applied to the edge wall of the gasket which has sliding contact against a relative movable member. In Fig. 1, the sealing edge would be the periphery of the gasket abutting the cylinder wall, whereas in Fig. 3, the sealing edge would be the inner edge abutting the shaft 32. In Fig. 3, the bottom or valley 16 at the cylinder wall is of greater width than the axial thickness of the gasket so that the gasket is free to move axially throughout its area and its entire area is exposed to pressure within the cylinder. If desired, the filler plate 31 may be suitably fixed against movement relative to the cylinder as by frictional grip or resilient tension against the cylinder wall induced by providing in the skirt 31ª a series of circumferentially spaced slits 31ᵇ.

Figure 4:
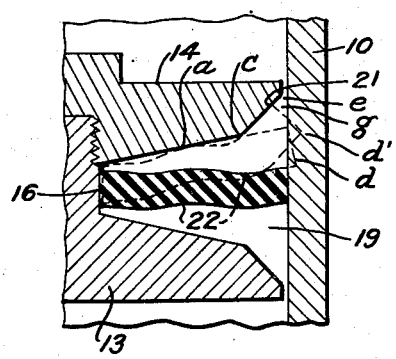
Fig. 4 is an enlarged fragmentary sectional view of a portion of the structure shown in Fig. 1.

In Fig. 4, the operating characteristic of the packing gland is shown, an enlargement of a portion of the structure of Fig. 1 being illustrative. When there is no pressure in the cylinder, the gasket will have resilient frictional contact with the abutting sealing surface, responsive to the radial compression of the gasket due to its excess of diameter relative to the inner wall of the cylinder. This resilient contact will, however, be on a radius perpendicular to the axis of the gasket. Upon axial pressure being brought to bear upon the gasket, the gasket is moved axially in the compartment due to the fact that the compartment faces 18 are spaced a greater distance than the thickness of the gasket, and the entire area of the gasket is subjected to the pressure within the cylinder, thereby providing a face-to-face contact of large area between the face of the gasket and the overlying face of the wall or plate 14. The gasket having been bodily moved axially of the compartment 19, the entire area of the pressure face of the gasket is exposed to an equalized pressure in the cylinder, and the gasket having a normal operating oversize diameter, it is radially expanded by such pressure so that its face which is opposite to the pressure face is crowded axially against the opposite compartment wall a and the body of the gasket is crowded radially against hub 16 and the cylinder wall, thus providing a very tight fit. In the employment of a gasket compartment having converging opposed faces, the pressure against the pressure face of the gasket flexes the sealing end of the gasket from a radius which is substantially perpendicular to the axis, to a radius lengthened diagonally, and the interposition of the wall of cylinder 10 in Fig. 1, and of the shaft 32 in Fig. 3, providing a physical barrier to radial spread, deforms the sealing edge of the gasket from the imaginary or projected position substantially as shown by dotted lines in Fig. 4, providing an extremely tight bearing at the point indicated d', the adjacent portion being compressed radially by the rigidity of the wall against which the gasket seals, it not being intended, of course, that the dotted lines at d and d' indicate that the sealing edge of the gasket actually extends at any time beyond the cylinder wall. The annular chamfer 21 increases the tilting of the sealing edge of the gasket and thus increases the angularity of the impingement against the abutting wall at d. An annular triangular space g is formed between the chamfered surface 21 of member 14 and the cylinder wall 10, providing a fulcrum point c. When the gasket is under pressure, the gasket material adjacent space g tends to intrude further into the space g toward the apex e, but its entrance is resisted because of the solidifying or compressing of the gasket material by the converging surfaces of the space g, providing what may be termed a wedge resistance area.

As the gaskets wear smaller in diameter, the radial compression induced by radial crowding thereof continues to maintain the gasket in contact at its sealing edge. The radial operating oversize of the gasket may be employed because of the relative spacing of the opposing face walls 18, allowing the gasket to be self-adjusting in its freely held relationship to swelling or shrinkage or wear at its sealing edge, especially where the convergence of faces 18 and chamfer 21 are employed, since the chamfer 21 provides the fulcrum point c and shortens the radius of the sealing edge thereby radially extending the sealing area d to its position d'.

Having thus described my invention, I claim:

1. In a packing gland structure, a cylinder, a relatively reciprocable member in the cylinder providing a hub for a gasket, a gasket holding compartment having axially spaced walls providing relatively spaced opposing faces transversely of the cylinder, and a gasket flexible throughout its body mounted in the compartment between said spaced wall faces, said gasket being of lesser axial thickness throughout its area than the axial width between said wall faces whereby the gasket is axially movable throughout its area and is subjected to the pressure in the cylinder over substantially the entire area of one gasket face, said gasket at its central portion having a hole therethrough for snugly engaging the reciprocable member hub and having a radial width greater than the radial distance between the wall of said hub and the opposing wall of the cylinder.

2. In a packing gland structure, a cylinder, a relatively reciprocable member in the cylinder providing a hub for a gasket, a gasket holding compartment having axially spaced walls providing relatively spaced opposing faces transversely of the cylinder, and a gasket flexible throughout its body mounted in the compartment between said spaced wall faces, said gasket being of lesser axial thickness throughout its area than the axial width between said wall faces whereby the gasket is axially movable throughout its area and is subjected to the pressure in the cylinder over substantially the entire area of one gasket face, said gasket at its central portion having a hole therethrough for snugly engaging the reciprocable member hub and having a radial width greater than the radial distance between the wall of said hub and the opposing wall of the cylinder, the opposed gasket compartment walls having relatively converged face portions.

3. In a packing gland structure, a cylinder, a relatively reciprocable member in the cylinder providing a hub for a gasket, a gasket holding compartment having axially spaced walls providing relatively spaced opposing faces transversely of the cylinder, and a gasket flexible throughout its body mounted in the compartment between said spaced wall faces, said gasket being of lesser axial thickness throughout its area than the axial width between said wall faces whereby the gasket is axially movable throughout its area and is subjected to the pressure in the cylinder over substantially the entire area of one gasket face, said gasket at its central portion having a hole therethrough for snugly engaging the reciprocable member hub and having a radial width greater than the radial distance between the wall of said hub and the opposing wall of the cylinder, the opposed gasket compartment walls having an annular bevel at an edge thereof adjacent a sealing edge of the gasket.

4. In a packing gland structure, a cylinder, a relatively reciprocable member in the cylinder providing a hub for a gasket, a gasket holding compartment having axially spaced walls providing relatively spaced opposing faces transversely of the cylinder, a gasket flexible throughout its body mounted in the compartment between said spaced wall faces, said gasket being of lesser axial thickness throughout its area than the axial width between said wall faces whereby the gasket is axially movable throughout its area and is subjected to the pressure in the cylinder over substantially the entire area of one gasket face, said gasket at its central portion having a hole therethrough for snugly engaging the reciprocable member hub and having a radial width greater than the radial distance between the wall of said hub and the opposing wall of the cylinder, the opposed gasket compartment walls having relatively converging face portions, and said compartment walls each having an annular bevel at an edge of the opposing faces adjacent a sealing edge of the gasket.

GEORGE N. HEIN.